United States Patent
Habibi-Naimi

(10) Patent No.: US 8,753,006 B2
(45) Date of Patent: Jun. 17, 2014

(54) STATIC MIXER

(75) Inventor: Sasan Habibi-Naimi, Rikon (DE)

(73) Assignee: Sulzer Mixpac AG, Haag (CH)

( * ) Notice: Subject to any disclaimer, the term of this patent is extended or adjusted under 35 U.S.C. 154(b) by 841 days.

(21) Appl. No.: 12/589,009

(22) Filed: Oct. 16, 2009

(65) Prior Publication Data

US 2010/0097883 A1 Apr. 22, 2010

(30) Foreign Application Priority Data

Oct. 17, 2008 (EP) .................................... 08166921

(51) Int. Cl.
*B01F 5/06* (2006.01)

(52) U.S. Cl.
USPC ......................................... 366/337; 366/339

(58) Field of Classification Search
USPC ...................... 366/181.5, 336–340; 48/189.4; 222/145.6; 138/37, 39, 40, 42
See application file for complete search history.

(56) References Cited

U.S. PATENT DOCUMENTS

| | | | | |
|---|---|---|---|---|
| 3,051,453 A * | 8/1962 | Sluijters | ........................ | 366/337 |
| 3,195,865 A * | 7/1965 | Harder | ........................ | 366/337 |
| 3,239,197 A * | 3/1966 | Tollar | ........................ | 366/337 |
| 3,328,003 A * | 6/1967 | Chisholm | ..................... | 366/337 |
| 3,406,947 A * | 10/1968 | Harder | ........................ | 366/337 |
| 3,983,196 A | 9/1976 | Gary | | |
| 5,851,067 A * | 12/1998 | Fleischli et al. | ............. | 366/337 |
| 5,944,419 A * | 8/1999 | Streiff | ........................ | 366/337 |
| 6,599,008 B2 * | 7/2003 | Heusser et al. | ............... | 366/337 |
| 6,773,156 B2 * | 8/2004 | Henning | ....................... | 366/337 |
| 7,325,970 B2 * | 2/2008 | Keller | ........................ | 366/337 |
| 7,438,464 B2 * | 10/2008 | Moser et al. | .................. | 366/336 |
| 8,491,180 B2 * | 7/2013 | Hirschberg et al. | ........... | 366/337 |
| 2003/0048694 A1 * | 3/2003 | Horner et al. | ................. | 366/337 |
| 2003/0164439 A1 | 9/2003 | Verbrugge | | |
| 2003/0179648 A1 * | 9/2003 | Heusser et al. | ............... | 366/336 |
| 2004/0008576 A1 | 1/2004 | Henning | | |
| 2004/0141413 A1 * | 7/2004 | Keller | .......................... | 366/337 |
| 2008/0050576 A1 | 2/2008 | Pierick | | |
| 2010/0097883 A1 * | 4/2010 | Habibi-Naini | ................ | 366/337 |
| 2010/0202248 A1 * | 8/2010 | Hirschberg et al. | ........... | 366/337 |
| 2013/0021870 A1 * | 1/2013 | Linne et al. | ................... | 366/337 |
| 2013/0107660 A1 * | 5/2013 | Pappalardo | ................... | 366/336 |
| 2013/0135963 A1 * | 5/2013 | Linne et al. | ................... | 366/337 |
| 2013/0182529 A1 * | 7/2013 | Linne | ........................... | 366/336 |

FOREIGN PATENT DOCUMENTS

EP 1 312 409 A1 5/2003

* cited by examiner

*Primary Examiner* — Charles E Cooley
(74) *Attorney, Agent, or Firm* — Francis C. Hand; Carella, Byrne, et al

(57) ABSTRACT

A method for the manufacture of a static mixer in an injection molding process includes the steps: injecting a polymer melt containing a foaming agent into a passage at an injection point at an injection pressure of less than 500 bar; filling the passage with the polymer melt containing a foaming agent; at least partial foaming of the melt containing a foaming agent in the passage, with the ratio of flow path length to height amounting to at least 10. The installation body is made up at least partly of foamed plastic and has a ratio of longitudinal dimension to diameter larger than 1 and a ratio of longitudinal dimension to wall thickness of at least 10.

11 Claims, 4 Drawing Sheets

STATIC MIXER

The invention relates to a static mixer and a method of making static mixers. More particularly, this invention relates to an installation body for a static mixer for installation into a tubular mixer housing. Still more particularly, this invention relates to a method of injection molding plastic static mixers with relatively small thicknesses and relatively long lengths.

Static mixers are well known for the mixing of various flowable materials. For example, EP1426099 B1 describes a static mixer in which two components are mixed with one another by means of a plurality of mixing elements of the same type in a three-part mixing process in which the mass is first divided, then spread and displaced. This mixing process has to be carried out several times depending on the physical properties of the components. For this reason, a plurality of installation bodies of the same construction are arranged sequentially in the static mixer. These mixers are in particular used for the mixing of small quantities of the components, that is, a few milliliters to approximately 1,000 milliliters. Accordingly, these mixers have a mixing space with a diameter of less than 10 mm with a length of more than 50 mm. This has the consequence that the wall thicknesses of the wall elements of this mixer can amount to less than 1 mm, often even less than 0.5 mm.

Mixers in accordance with EP1426099 B1 of plastic are preferably manufactured in an injection molding process. The manufacture of a mixture of 30 mm length with a wall thickness of less than 3 mm using an injection molding process was previously not possible since the flow path from the injection point of the injection molding tool up to the oppositely disposed end of the mixer required very high inner tool pressures. In order to ensure that the wall elements of the mixer furthest away from the injection point are also completely filled with polymer melt, inner tool pressures of more than 1,000 bar would have to be provided. Conventional injection molding tools previously did not withstand these high inner tool pressures when thin-walled static mixers had to be manufactured with the stated dimensions. It has therefore not been possible to date to manufacture mixers, in particular of plastic, with wall thicknesses of less than 3 mm and ratios of mixer length to wall thickness of more than 10 economically in an injection molding process.

The forming of shrink marks has to be considered as a further problem in the manufacture of a static mixer with a ratio of mixer length to wall thickness of more than 10 by means of an injection molding process. Even with inner tool pressures of more than 1,000 bar, it cannot be precluded that a static mixer with a geometry as in EP1426099 B1 has shrink marks.

Accordingly, it is the object of the invention to provide a static mixer with relatively small wall thicknesses and great length that can be manufactured by an injection molding process.

Briefly, the invention provides an installation body for a static mixer for installation into a tubular mixer housing. The installation body is comprised of at least partially foamed plastic and has a longitudinal dimension, a width and a wall thickness wherein the ratio of the longitudinal dimension to the width is at least 1; and wherein the ratio of the longitudinal dimension to the wall thickness is at least 10.

The invention also provides a method for the manufacture of the installation body that comprises the steps of providing an injection molding tool having a passage defining a flow path and an injection point in communication with the passage wherein with the ratio of the length of the flow path to the height of the flow path is at least 10; injecting a polymer melt containing a foaming agent through the injection point and into the passage at an injection pressure of less than 500 bar; filling the passage with the polymer melt; and allowing the polymer melt to at least partially foam in the passage.

With respect to the conventional injection molding process, a polymer containing a foaming agent is used for the manufacture of the installation body which foams during or directly subsequent to the injection.

Preferably, the injection molding method of the invention injects a polymer containing a foaming agent into an injection molding tool at an injection pressure of less than 300 bar, particularly preferably less than 200 bar.

The method subsequently includes the steps of cooling the at least partly foamed polymer melt in the passage; solidifying the polymer melt for the formation of the installation body; enlarging the cross-section of the passage; and removing the installation body.

The injection of the polymer containing a foaming agent advantageously takes place starting from a single injection point.

The polymer containing a foaming agent foams at least in the regions furthest away from the injection point. The required amount of polymer per manufactured mixer is reduced by a foamed plastic since the foamed plastic contains bubbles. These bubbles advantageously have a mean diameter of no more than 100 µm, preferably no more than 50 µm, particularly preferably no more than 10 µm.

An injection molding tool for the manufacture of an installation body for a static mixer from a polymer melt containing a foaming agent includes a passage and an injection opening for the introduction of the polymer melt into the passage, with the passage substantially having the dimensions of the installation body for the static mixer and the passage having a ratio of the length of the flow path to the height of the flow path of at least 10. The ratio of flow path length to height can, in particular, be more than 50, preferably more than 140, particularly preferably more than 180.

The passage of the injection molding tool has a longitudinal axis which substantially corresponds to the longitudinal axis of the installation body and has a cross-sectional passage area which is arranged substantially normal to the flow direction of the polymer melt, with the cross-sectional passage surface having a width dimension and a thickness dimension. The thickness dimension substantially corresponds to the wall thickness of the installation body and the passage has the geometrical shape of the installation body.

The thickness dimension amounts to no more than 2.5 mm, preferably no more than 2.3 mm, particularly preferably no more than 2 mm.

The passage can have a main passage and a plurality of side passages depending on the geometry of the installation body static mixer.

A first side passage has the shape of a plate element which is determined by the length of the side passage, the width dimension and the thickness dimension. The length of the plate element of the first side passage extends substantially in the direction of the longitudinal axis of the passage. The cross-sectional passage area spanned by the width dimension and by the thickness dimension is arranged substantially normal to the length.

A second side passage can be provided which has the shape of a plate element, with the thickness dimension extending substantially in the direction of the longitudinal axis and the plane spanned by the longitudinal dimension and by the width dimension being arranged at an angle to the longitudinal axis. The plane can in particular be arranged at an angle of 90°.

The plate element can include a curvature, that is one of the longitudinal dimensions or width dimensions includes a curve shape.

In accordance with a preferred embodiment of the injection molding tool, a mixing nozzle can be arranged upstream of the inlet opening into the passage for the homogenization of the polymer melt containing a foaming agent.

The invention also provides a static mixer that comprises a tubular housing having a longitudinal axis and defining a flow passage for a fluid; and at least one installation body, as above, disposed in the housing for mixing the fluid passing through the flow passage of the housing.

The installation body may be constructed for positioning in a tubular housing of circular cross-section or rectangular cross-section. For non-circular tubular mixer housings, the installation body has a "diameter" or width corresponding to the edge length when the cross-sectional area of the tubular mixer housing is square. For other non-circular cross-sectional shapes of the mixer housing, for example with rectangular or oval cross-sections, an equivalent diameter $D_a$ is determined under the assumption that the cross-sectional area were circular, that is using the formula $D_a=2*(A/\pi)^{1/2}$. $D_a$ then stands for the equivalent diameter; A for the actual cross-sectional area. The ratio of longitudinal dimension to diameter is at least 1, with either the diameter of the circular cross-section or the equivalent diameter for non-circular cross-sections having to be used as the diameter.

The installation body is at least partly made of foamed plastic. If a single installation body is provided, the longitudinal dimension corresponds to the longitudinal side of the installation body. If a plurality of installation bodies are arranged behind one another, the longitudinal dimension results from the sum of the longitudinal sides. The ratio of longitudinal dimension to diameter can in particular be larger than 3, preferably larger than 5, particularly preferably larger than 7.

Static mixers of large construction length can in particular be manufactured economically due to the significantly lower inner tool pressure. The lower inner tool pressures are due to the fact that the plastic used is present as a polymer containing a foaming agent, which polymer is foamed in the course of the injection molding process so that an installation body is present after the end of the injection molding process which is made at least partly of foamed plastic. The ratio of flow path to wall thickness is at least 10 for this installation body which is used as a static mixer. The ratio of flow path to wall thickness can in particular be more than 50, preferably more than 140, particularly preferably more than 180.

The polymer containing a foaming agent has a lower viscosity than a comparable polymer without a foaming agent since the viscosity of the polymer is reduced by the foaming agent which can be present as a physical or as a chemical foaming agent. A polymer melt can in particular be used which contains a physical gas, in particular a supercritical gas such as $CO_2$, or a chemical foaming agent and which is present as a one-phase solution. The foamed plastic has cells with a cell size of less than 100 μm, with a cell density of larger than at least approximately $10^6$ cells/cm$^3$ being able to be provided.

To manufacture a static mixer from foamed plastic, flowable material is introduced into an injection molding tool under pressure. The injection molding tool bounds a hollow space which has the shape of the static mixer. To obtain a solution of supercritical fluid in the polymer which is foamed, a specific mixing time is required which is the smaller, the thinner the walls of the static mixer.

For the manufacture of a static mixer, plastic pellets are melted in an extruder in a first process step. Then, a foaming agent, for example in the form of supercritical gas, in particular $CO_2$ is added. On the one hand, the foaming agent can be added in a selected position of the plasticizing screw by actuation of a suitable throughflow regulating valve. The temperature and the pressure of the foaming agent are regulated such that the foaming agent is changed into its supercritical state. The foaming agent can also be preheated before the introduction to avoid a sudden pressure increase at a higher temperature. Alternatively to this, the foaming agent can be added outside the plasticizing cylinder, in particular as a supercritical fluid. The foaming agent is subsequently mixed with the polymer melt in the plasticizing cylinder by the plasticizing screw. This mixing process increases the subsequent diffusion of the foaming agent into the polymer up to the saturation of foaming agent in the polymer. The contact area of the two materials is enlarged by the mixing process and the required penetration depth for the diffusion process is reduced accordingly. The foaming agent is therefore mixed with the melted polymer by the movement of the plasticizing screw, which contributes to producing a solution of foaming agent in the polymer. As long as the plasticizing screw rotates, it produces a two-dimensional shear field in the foaming agent/polymer system to be mixed. In this respect, the bubbles forming by the foaming agent are stretched in the shear direction. The stretched bubbles are broken down into smaller spherical bubbles by perturbation of the laminar flow. The plasticizing screw advantageously has irregularly arranged blades so that the orientation of the interface of foaming agent/polymer varies in the relationship of the flow lines, whereby the efficiency of the laminar mixture increases.

During the mixing process, for which a static mixer can be used, diffusion of the bubbles also occurs in the polymer melt which surrounds each of the bubbles. The conversion of the two-phase mixture into a one-phase solution only takes place subsequently in the diffusion chamber. In the one-phase solution, the foaming agent concentration is substantially uniform so that the solution can be considered homogeneous.

Subsequent to the diffusion, the solution is heated fast, whereby a nucleation takes place in the saturated solution. Nucleation is understood as a nucleus formation which represents the basis for the formation of the foam with a mean cell size of a maximum of 100 μm. A thermodynamic instability is produced by the heating due to the reduced solubility of the foaming agent in the polymer at this higher temperature. The more the solubility is reduced as the temperature increases, the greater the nucleation rate and the greater the number of the nucleated cells. A high pressure is maintained so that these cells do not already grow in the plasticization cylinder.

The solution with the nucleated cells is then introduced into a hollow mold space of an injection molding tool. The pressure is controlled in the injection molding tool, for example by the introduction of compressed air. A cell growth in the injection molding tool only takes place due to the pressure instability when the pressure in the injection molding tool falls fast. The flow resistance on the use of a polymer containing a foaming agent is reduced accordingly.

It only hereby becomes possible to lower the inner tool pressure such that the pressure load of the tool comes to lie in the permitted range in which a premature failure of the tool is no longer to be anticipated. However, for various reasons, the use of polymers containing foaming agents for the manufacture of such long, thin-walled static mixers has been foreseen to date. On the one hand, it is not to be expected that such a thin-walled mixer with complex geometry can be produced at all by the lowering of the injection speed which results due to the lowering of the inner tool pressure. Such a phenomenon known from the injection molding process is called freezing in professional circles.

In this "freezing" process, solidification of the polymer melt injected into the injection molding tool occurs in regions of the injection molding tool close to the walls. This solidification can be caused by temperature gradients between the melt and the wall, but can likewise occur in a tool which has the temperature of the polymer melt since the flow speed of the polymer melt is lower in regions of the injection molding tool close to the wall than in middle regions.

The flow of a polymer melt through an injection molding tool corresponds to a flow through a closed passage. A flow profile of the speed of such a flow is substantially parabolic. The axis of symmetry of the parabola substantially corresponds to a central longitudinal axis of the passage. The flow speed has the value 0 at the wall of the injection molding tool. Due to this flow profile, the polymer has a different dwell time in the passage formed by the injection molding tool. A larger dwell time of the polymer melt consequently results in the wall regions in which the flow speed is low, which has the consequence that reactions, for example crosslinking reactions, can also occur inside the polymer melt even without cooling. A freezing of the polymer melt in the wall regions hereby occurs. This has the consequence that the passage cross-section still available for the throughflow of the polymer melt is reduced. This reduction in the passage cross-section is hardly of any import with components with a wall thickness of more than 3 mm since the freezing remains limited to a small region of the passage close to the wall so that the polymer melt can flow through the injection molding tool substantially without impediment for manufacturing components with wall thicknesses of more than 3 mm.

Each of the cross-sectional areas has a wall thickness, with the ratio of longitudinal dimension to wall thickness amounting to at least 40, preferably at least 50, particularly preferably at least 75. A cross-sectional area can intersect a plurality of wall elements so that the wall thickness does not have to be clearly determined by the indication of the cross-sectional area alone. However, the actual wall thickness is decisive for the design of the injection molding tool. The thinner this wall thickness is, the more the previously described wall effects are noticeable on the injection of the polymer melt into the injection molding tool. It follows from this that a comparatively higher inner tool pressure is to be provided for small wall thicknesses. The wall thickness of the static mixer can be less than 3 mm, preferably less than 2 mm, particularly preferably less than 1.5 mm, without the permitted inner tool pressure being exceeded.

A plurality of installation bodies can in particular be arranged behind one another along the longitudinal axis. These installation bodies can either have the same construction or installation bodies of different construction can be combined with one another so that a mixer arrangement arises such as is shown in EP1312409 B1. Adjacent installation bodies are advantageously connected to one another so that the mixer made up of this plurality of installation bodies is made as a monolithic part. This means that the mixer is manufactured in its totality in a single injection molding tool. The installation body or the totality of the installation bodies can have a longitudinal dimension between 5 and 500 mm, preferably between 5 and 300 mm, preferentially between 50 and 100 mm.

The static mixer is advantageously designed such that the installation body has a longitudinal axis which is oriented in the direction of a fluid flowing into the installation body so that a mixing space can be spanned by the installation body, with the mixing space having a cross-sectional flow area in a plane normal to the longitudinal axis which substantially corresponds to the cross-sectional flow area of the tubular mixer housing. The installation body includes a wall element for the division and/or deflection of the fluid flow in a direction deviating from the longitudinal axis, with a cross-sectional area being able to be produced by an intersection of the wall element with the plane and this cross-sectional area amounting to a maximum of $\frac{1}{5}$, preferably to a maximum of $\frac{1}{10}$, particularly preferably to a maximum of $\frac{1}{20}$ of the cross-sectional flow area of the mixing space.

The installation body is at least partly made of foamed plastic. On use of a foamed plastic, it has surprisingly been found that the same flow path can be achieved with substantially lower inner tool pressures. The use of foamed plastic consequently makes it possible to extend the flow path in comparison with the prior art so that mixers with a larger longitudinal dimension can be manufactured.

The cross-sectional area of the wall element in accordance with a first embodiment forms a first broad side by which the mixing space can be divided into two part regions. The flow of mixing product, of a fluid mass, is thus divided into two part flows which can have the same size or a different size depending on the position of the broad side in the mixing space. More than two broad sides can naturally also be formed so that correspondingly more than two part flows arise.

Frequent changes of the cross-section of the injection molding tool to be flowed through by the polymer melt containing a foaming agent result due to the complex geometry of the static mixer. These changes are caused by the geometry and arrangement of the wall elements which form the installation bodies of the static mixer and for which corresponding hollow spaces and passages have to be provided in the injection molding tool.

The regulation of the pressure in the injection molding tool takes place in this special case such that an inner tool pressure is provided at the start of the injection process at which the polymer melt containing a foaming agent is still present as a one-phase solution and this pressure is lowered during the filling of the hollow mold space of the injection molding tool for the static mixer. The lowering of the pressure takes place such that a foam is formed during the injection, in particular a foam having cell diameters of less than 100 μm and/or a cell density of more than at least approximately $10^6$ cells/cm$^3$. Since the foam is already formed during the injection, the viscosity of the polymer melt falls since the arising cells are made in the two-phase state as bubbles which contain compressible gas. This reduced viscosity accordingly makes it possible to reduce the injection speed with respect to conventional injection molding processes for non-foamed components at a substantially lower inner tool pressure. A change in the wall effects, in particular in regions in which the polymer melt is deflected, likewise arises due to the lower viscosity.

It is known that regions close to the wall of the injection tool are foamed less or not at all for simple geometries with substantially rectangular cross-sections. If a static mixer is in particular made up of installation bodies in accordance with one of the geometries described more precisely in the following, large deflections of the flow result in the flow path of the polymer melt at each edge of the wall element and at the transition to a following wall element so that polymer melt which is disposed in a marginal region of the opening of the injection molding tool in the first wall element flows in the following second wall element into a central region of this second wall region and the formation of a two-phase foam occurs. Foam formation therefore arises along the total longitudinal dimension of the mixer when the injection pressure is lowered as above due to an arrangement of adjacent wall elements at an angle to one another, in particular a cross-wise arrangement of adjacent wall elements.

The wall element in accordance with a second embodiment has a substantially rectangular shape and a second broad side which is disposed opposite the first broad side and which is rotated by an angle relative to the first broad side in accordance with a preferred embodiment so that a spiral structure is formed.

In accordance with a third advantageous embodiment, the wall element includes a bar element whose first broad side forms a flow-dividing edge and whose second broad side is adjacent to a deflection element which serves for the deflection of the flow from a first part region of the mixing space into a second part region of the mixing space. The surface of the wall element bounded by the first broad side and by the second broad side is aligned substantially in the direction of the longitudinal axis and the surface of the deflection element is substantially disposed in a transverse plane which is in particular aligned at an angle to the longitudinal axis of 45° up to 90°, preferably of 60° up to 90°, particularly preferably of 75° up to 90°.

In accordance with a fourth, particularly preferred embodiment of a mixer which has small dead spaces and a reduced pressure drop with a high mixing performance, the installation body includes a plurality of wall elements, with each wall element having a substantially rectangular cross-section including a first broad side, a second broad side as well as a first longitudinal side and a second longitudinal side.

The wall element is arranged in the installation body such that the longitudinal sides extend substantially in the direction of the longitudinal axis and the first broad side and the second broad side extend transversely to the direction of the longitudinal axis. The installation body includes a first wall element which divides the mixing space into two parts. At least two wall elements which intersect the first wall element adjoin the first wall element. The first wall element is advantageously connected to the second wall element and to the third wall element via at least one transition element.

The flow of the mixing product is deflected by means of the transition element so that the components which enter into the static mixer as strands are divided continuously during their path through the static mixer into strips of reducing width, whereby components which are difficult to mix or have high viscosity can also be processed with this static mixer.

Adjacent installation bodies are advantageously connected to one another via at least one connection element. The construction of the static mixer becomes stiffer due to this connection element so that a curvature of the mixer relative to its longitudinal axis can take place less easily and the mixer can be fit into a pipe surrounding the mixing space.

The installation bodies in accordance with the previously described embodiments can be combined with one another as desired.

The static mixers described above are suitable as disposable mixers since their manufacturing and material costs are low as soon as the corresponding injection molding tool has been manufactured. Furthermore, the static mixers are used in metering and/or mixing units. In particular a multicomponent cartridge can be named as an example which includes a discharge device and a pipe which is coupled to the discharge device and which contains a static mixer in accordance with one of the preceding embodiments.

The static mixer can be attached to a discharge unit or to a discharge cartridge, in particular to a multicomponent cartridge. The static mixer can be used for the mixing of a hardening mixing product of flowable components. A further possible use of the static mixer is the mixture of casting compounds in the dental field or the mixture of multicomponent adhesives.

The invention will be explained in the following with reference to the drawings. There are shown:

Figure 1:
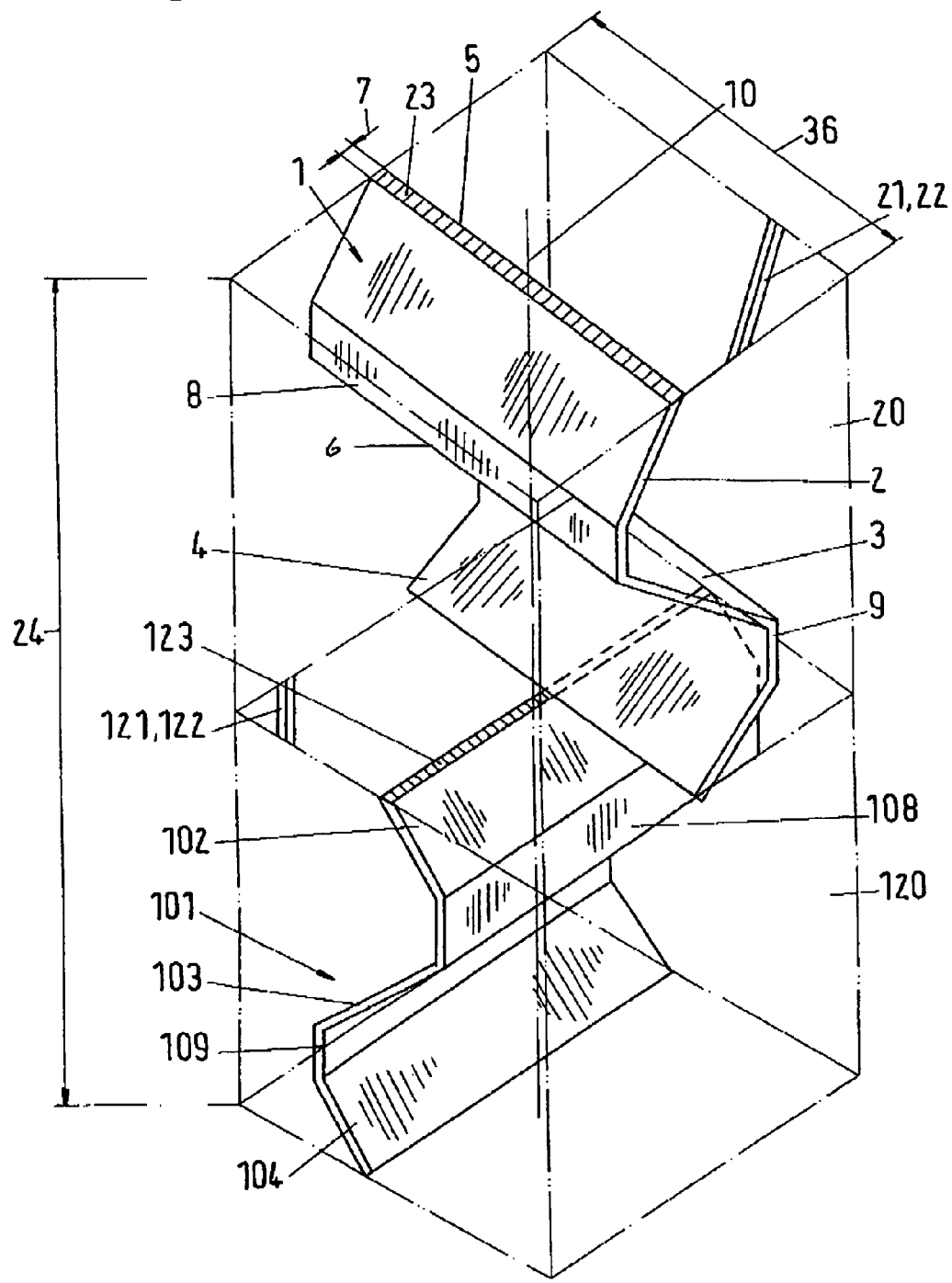
FIG. 1 illustrates a perspective view of a first embodiment of a static mixer in accordance with the invention.

A first embodiment of the static mixer in accordance with the invention is shown in FIG. 1. The static mixer includes an installation body 1 which is installed in a tubular housing (not shown). The tubular housing serves as a boundary of a mixing space 20 which is located in the interior of the tubular housing. A fluid to be mixed, which is as a rule made up of at least two different components, flows through the mixing space 20. In most cases, the components are present in the fluid state or as viscous masses. This includes, for example, pastes, adhesives, but also fluids which are used in the medical sector which contain pharmaceutical agents or fluids for cosmetic applications as well as foods. Such static mixers are also in particular used as disposable mixers for the mixing of a hardening mixing product of flowable components such as the mixing of multicomponent adhesives. Another preferred use is in the mixture of casting compounds in the dental field.

The installation body 1 itself has no moving parts so that the mixing process takes place through the flowing fluid itself. The lack of moving installations is to be seen as the main reason for the designation of such a mixer as a static mixer. The installation body 1 has a longitudinal axis 10 which is simultaneously the longitudinal axis of the tubular housing. The longitudinal axis 10 is disposed in the main flow direction, that is in the direction of the flow which is present in a tubular housing without any installations or manifolds. The installation body furthermore has a diameter 36. If a plane 21, 121 is applied through the mixing space 20, 121 normal to this longitudinal axis at any desired point, a cross-sectional flow area 22, 122 results which substantially corresponds to the cross-sectional flow area of the tubular mixer housing without installations. It must be noted in this respect that the installation body 1 is intersected by the plane 21, 121, whereby a cross-sectional area 23, 123 results.

The value for the cross-sectional flow area 22, 122 is therefore smaller in the region of the wall element than the value for the cross-sectional flow area of the tubular mixer housing. The cross-sectional area amounts to a maximum of ⅕ of the cross-sectional flow area 22, 122. It is endeavored in the design of the wall elements to design them with walls which are as thin as possible so that the material requirement of polymer for the manufacture of the installation body is reduced as much as possible. The proportion of the cross-sectional area of ⅕ of the cross-sectional flow area is necessary for fluids which have to be conveyed through the mixer at high pressure, such as viscous fluids or pastes. In this case, a certain mechanical stability of the mixer is required. For fluids of lower viscosity or for shorter mixers, the proportion can be reduced to ⅒ or less or even to 1/20 or less.

For installation bodies 1 which have at least one plane of symmetry which divides the mixing space into two equal parts, the longitudinal axis is disposed in this plane of symmetry. The installation body 1 contains at least one wall element 2, 3, 4, 8, 9 which serves for the division and/or deflection of the fluid flow into a direction deviating from the longitudinal axis. As a rule, the fluid flows at both sides of the wall element.

The wall element 2 has a first broad side 5 which extends substantially over the width or over the diameter of the mixing space, that is as a rule up to the wall of the tubular housing. The wall element 2 has a second broad side 6 which is arranged downstream of the first broad side 5. In accordance with FIG. 1, a second wall element 8 adjoins the second broad side 6 and is followed by a third wall element 3. A fourth wall element 9 is arranged downstream at the third wall element 3 and is in turn adjoined by a fifth wall element 4. The wall element 2 has an angle of inclination to the longitudinal axis 10 so that a deflection of the two part flows formed by the first broad side 5 occurs.

In accordance with a simpler variant, which is not shown in the drawing, a wall element 102 of an adjacent installation body 101 can adjoin the first wall element 2. Adjacent installation bodies 1, 101 are preferably arranged rotated with respect to one another, in particular rotated by an angle of 90° with respect to one another. The installation bodies 1, 101 in accordance with FIG. 1 thus include a sequence of wall elements 2, 3, 4, 102, 103, 104 which are arranged alternatingly at an angle to the longitudinal axis 10 as well as intermediate pieces 8, 9, 108, 109 which are aligned parallel to the longitudinal axis. The installation body 101 is rotated by 180° with respect to the installation body 1.

Figure 2:
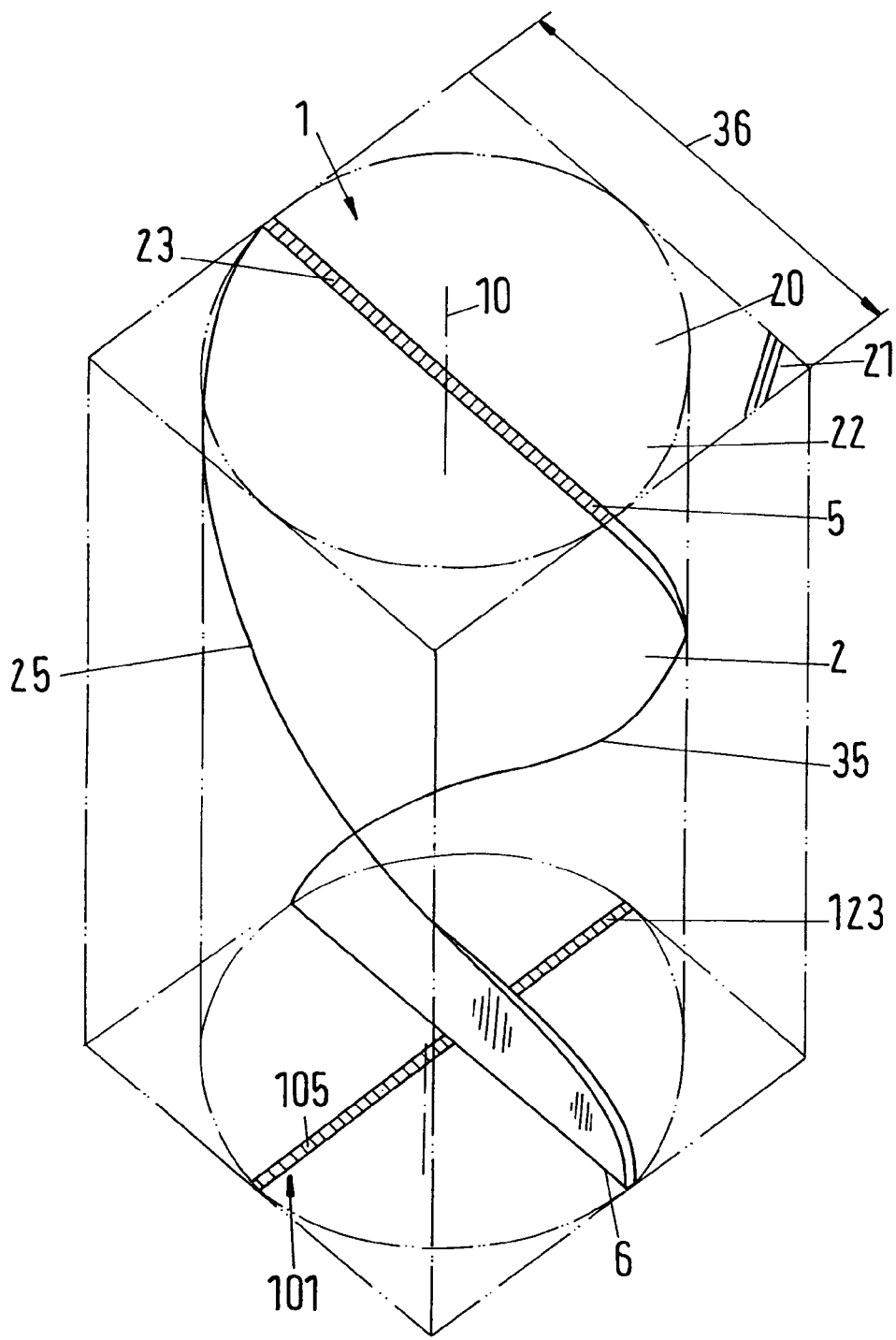
FIG. 2 illustrates a perspective view of a second embodiment of a mixer in accordance with the invention.

An installation body 1 for a static mixer of a second embodiment is shown in FIG. 2. The installation body serves for the installation into a tubular housing which in this case can be made selectively with a rectangular or diamond-shaped cross-sectional flow area or also with a circular or elliptical cross-sectional area. This installation body 1 consists of a single wall element 2 which is made as a plate-shaped element with a rectangular surface and a cross-sectional area 23 which corresponds to the wall thickness 7. The cross-sectional area 23 results as a sectional area of the plate-shaped element with a plane 21 which stands normal on the longitudinal axis 10 which corresponds to the axis of symmetry of the plate-shaped element in the main flow direction.

The flow of the fluid through the mixing space without flow-deflecting installations such as installation bodies should in turn be defined as the main flow direction. The plate-shaped element has a first broad side 5 as well as a second broad side 6 as well as two longitudinal sides 25, 35 connecting the two broad sides. The first and second broad sides divide the mixing space 20 spanned by the wall element 2 into two parts, in the case of FIG. 2 into two halves. So that the flow of the fluid along the wall element 2 can be deflected, the first broad side 5 is twisted relative to the second broad side 6 around the longitudinal axis 10 so that the two longitudinal sides 25, 35 each form a helical line or the surfaces of a spiral structure. In the wall element shown in FIG. 2, the first broad side 5 is rotated by 180° with respect to the second broad side 6. The longitudinal sides 25, 35 preferably contact the tubular housing surrounding them or are arranged at most a small spacing from the tubular housing so that it is avoided that part flows of the fluid flow unimpeded along the inner wall of the tubular housing and remain excluded from the mixing process.

At least one further installation body 101 can in turn adjoin the installation body 1; only the cross-sectional area 123 of this is indicated. The first broad side 105 of the cross-sectional area 123 is arranged at an angle to the second broad side of the installation body 1. In the representation of FIG. 2, the angle amounts to 90° measured in the cross-sectional flow area 122.

Figure 3:
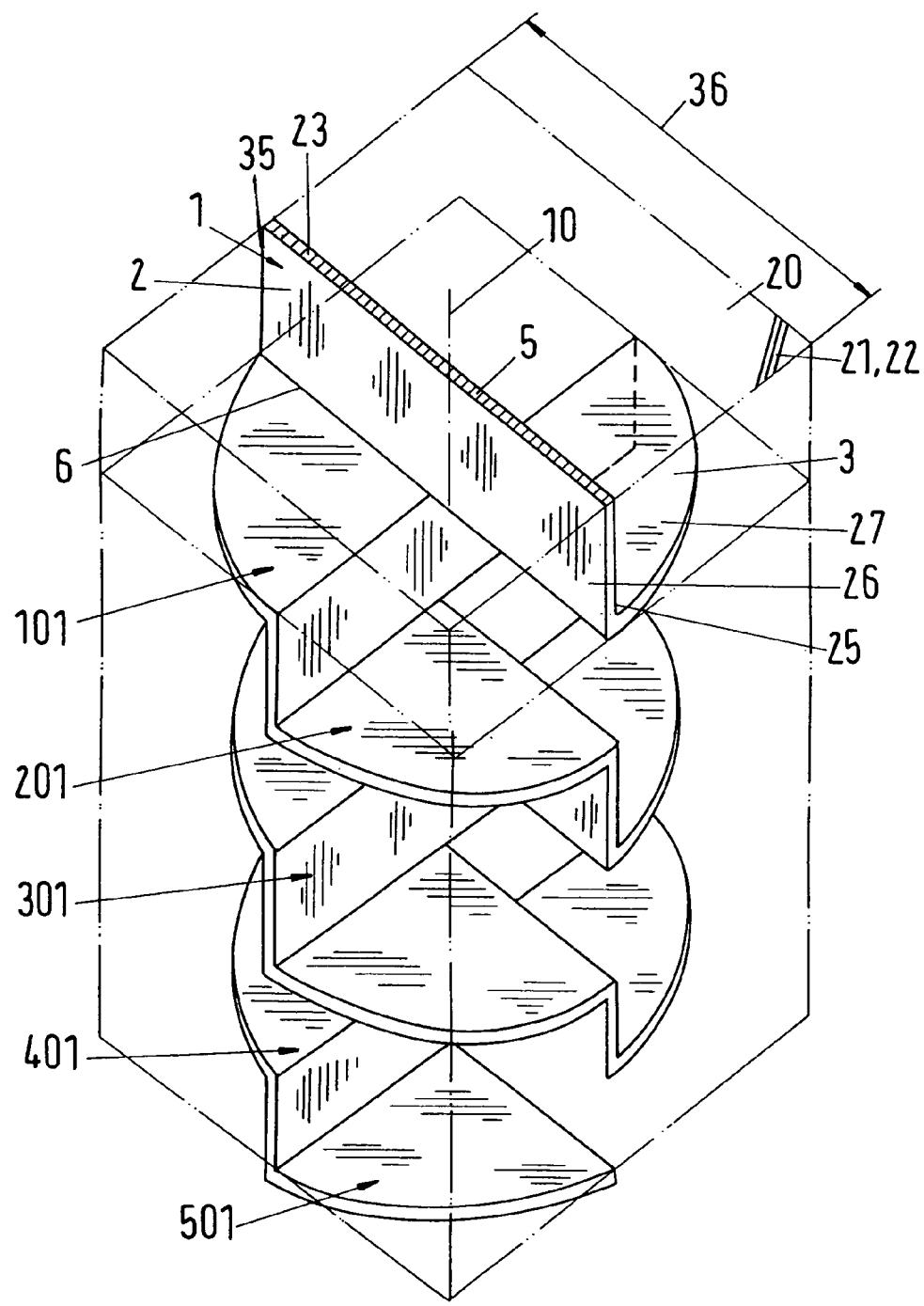
FIG. 3 illustrates a perspective view of a third embodiment of a mixer in accordance with the invention.

FIG. 3 shows a further embodiment of a static mixer including a plurality of installation bodies 1, 101, 201, 301, 401, 501 for installation into a tubular housing. A first installation body 1 is made of a plate-shaped wall element 2 with a rectangular cross-section which includes a first broad side 5, a second broad side 6, a first longitudinal side 25 as well as a second longitudinal side 35. The first broad side 5 is disposed in the plane 21 which represents a cross-sectional flow area 22 which is disposed normal to the main direction of flow as defined in connection with FIG. 1. The two longitudinal sides 25, 35 also contact the tubular housing, not shown, in this case or have an at most small spacing from the tubular housing.

The wall element 2 has the function of a bar element 26 which divides the flow into two parts whose deflection is negligible with the exception of the deflection at the edges of the first broad side 5. For this reason, a deflection element 27 adjoins the bar element 26 downstream thereof. The deflection element 27 is preferably disposed in a plane which is aligned parallel to the plane 21 or is arranged at an angle of inclination with respect to the plane, with the angle of inclination amounting to no more than 60°, preferably no more than 45°, particularly preferably no more than 30°. The smaller the angle of inclination between the surface of the deflection element 27 and the plane 21, the smaller the required construction length, but the more the pressure loss increases. Or in other words: the surface of the deflection element is substantially disposed in a transverse plane which is aligned at an angle of 45° up to 90°, preferably of 60° up to 90°, particularly preferably of 75° up to 90° to the longitudinal axis. The deflection element 27 can also be understood in agreement with FIG. 1 as a wall element 3; in contrast to the wall element of FIG. 1, however, the mixing space 20 is divided into 4 part spaces. The cross-section flowed through is reduced locally to two of the 4 part spaces by the deflection element. In accordance with FIG. 3, each of these part spaces is a sector, with an opening angle of 90° when the cross-sectional flow area is circular. Alternatively to this, each of the part spaces could also have a square cross-section when the deflection element is likewise designed for a mixer housing having a square cross-section. In this case, instead of the curvature of the deflection element shown, accordingly a quadrilateral deflection element would have to be provided with edges which are adjacent to the inner walls, not shown, of the tubular housing.

Figure 4:
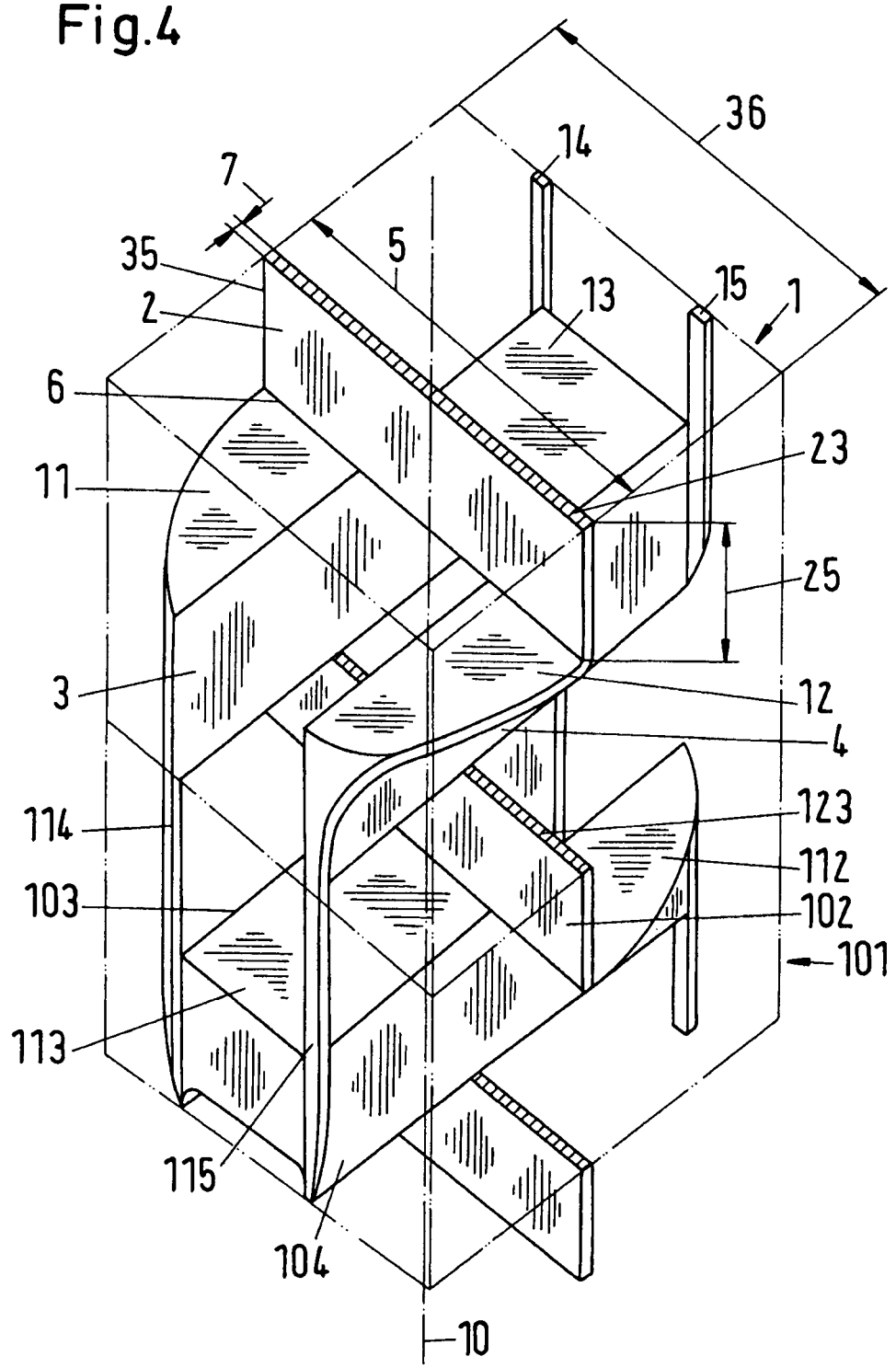
FIG. 4 illustrates a perspective view of a fourth embodiment of a mixer in accordance with the invention.

A further embodiment of a static mixer is shown in FIG. 4 in which the fluid flow can be divided section-wise into more than two part flows. The static mixer of plastic in accordance with FIG. 4 includes an installation body 1 for installation into a tubular mixer housing, wherein the installation body 1, 101 has a longitudinal axis 10 which is aligned in the direction of a fluid flowing into the installation body 1, 101 so that a mixing space 20, 120 can be spanned by the installation body 1, 101, wherein the mixing space 20, 120 has, in a plane 21, 121 normal to the longitudinal axis 10, a cross-sectional flow area 22, 122 which substantially corresponds to the cross-sectional flow area of the tubular mixer housing, wherein the installation body 1, 101 includes a wall element 2, 3, 4, 102, 103, 104 for the division and/or deflection of the fluid flow in a direction deviating from the longitudinal axis.

A cross-sectional area 23, 123 is produced by an intersection of the wall element 2, 3, 4, 102, 103, 104 with the plane 21, 121 and this cross-sectional area 23, 123 amounts to a maximum of $1/5$, preferably a maximum of $1/10$, particularly preferably a maximum of $1/20$, of the cross-sectional flow area 22, 122 of the mixing space 20, 120.

The installation body 1 includes a plurality of wall elements 2, 3, 4, with each wall element 2, 3, 4 having a substantially rectangular cross-section including a first broad side 5, a second broad side 6 as well as first and second longitudinal sides 25, 35. Each of the wall elements 2, 3, 4 is arranged in the installation body 1 such that the longitudinal sides 25, 35 extend substantially in the direction of the longitudinal axis 10 and the first broad side 5 and the second broad side 6 extend transversely to the longitudinal axis. The installation body includes a first wall element 2 which divides the mixing space into two parts. At least two wall elements 3, 4 which intersect the first wall element 2 adjoin the first wall element 2. The angle of intersection amounts to 90° in the embodiment in accordance with FIG. 4, but can adopt values differing herefrom.

In accordance with FIG. 4, the first wall element 2 is connected to the second wall element 3 and to the third wall element 4 via at least one transition element 11, 12, 13, 111, 112, 113. The transition element can, as already shown in FIG. 3, be designed as a deflection element to deflect the fluid flow from one part region of the cross-sectional flow area into another part region.

Adjacent installation bodies 1, 101 can be connected to one another via at least one connection element 14, 15, 114, 115. Such a connection element increases the bending stiffness of the static mixer. Furthermore, it is ensured via the connection element that the polymer melt can flow from the first installation body 1 to the first installation bodies 101 (and any other further installation bodies arranged downstream). If the connection elements were not present, the transition from the wall element 3 or 4 to the wall element 102 disposed downstream would namely be made up of namely only the common intersection surface which in this case is made up of two squares which would have a side length corresponding to the wall thickness 7. The total polymer melt for the installation bodies disposed downstream would have to pass through these restriction points, which would result in local pressure peaks in the tool. In addition, a long dwell time of the polymer melt would result in the regions of the wall elements which would come to lie close to the tubular housing in use, which would result in changes in the polymer melt and, under certain circumstances, in a deterioration of the physical properties and in inhomogeneity. In particular when a melt containing a foaming agent is used to generate a foamed structure, such dead spaces would be disadvantageous for the injection molding process.

Analogously to the manner shown in FIG. 4, connection elements can also be provided in the embodiment in accordance with FIG. 1 or 2 which were, however, left out to simplify the representation in FIGS. 1 and 2. The transition elements 27 of FIG. 3 likewise satisfy the function of connection elements.

Adjacent installation bodies 1, 101 are rotated in accordance with FIG. 4 at an angle of 180° around the longitudinal axis 10. The installation bodies in accordance with any one of the preceding embodiments can be combined with one another as desired. In particular, additional connection elements can also be provided to combine installation bodies of different embodiments with one another to form a hybrid structure to improve the mixing effect.

The static mixer in accordance with any of the preceding embodiments is made of plastic by means of which even comparatively complicated geometries can be realized in the injection molding process. The totality of installation bodies (1, 101, 201, 301, . . . ) has a longitudinal dimension 24 and each of the cross-sectional areas 23, 123 has a wall thickness 7 in particular for static mixers including a plurality of installation bodies. The ratio of longitudinal dimension 24 to wall thickness 7 amounts to at least 40, preferably at least 50, particularly preferably at least 75. For the preferred use of static mixers for small fluid quantities, the wall thickness 7 is less than 3 mm, preferably less than 2 mm, particularly preferably less than 1.5 mm. The totality of the installation bodies 1, 101 has a longitudinal dimension 24 between 5 and 500 mm, preferably between 5 and 300 mm, preferentially between 50 and 100 mm.

Experimentally, static mixers in accordance with the fourth embodiment were able to be manufactured with a longitudinal dimension of 60 mm and a mean wall thickness of 0.42 mm in a foamed construction. Accordingly, the ratio of flow path to wall thickness amounts to 143:1. Such a mixer is made up of 12 installation bodies.

Furthermore, a static mixer in accordance with the third embodiment was able to be manufactured with a longitudinal dimension of 100 mm and a mean wall thickness of 0.42 mm in a foamed construction. Accordingly, the ratio of flow path to wall thickness amounts to 238:1. This mixer is made up of 24 installation bodies.

What is claimed is:

1. A static mixer comprising
a tubular housing having a longitudinal axis and defining a flow passage for a fluid; and
at least two installation bodies disposed in said tubular housing and connected together in coaxial relation to each other disposed in said for mixing the fluid passing through said flow passage of said housing, each said installation body being rotated relative to the other of said two installation bodies and being comprised of at least partially foamed plastic having a longitudinal dimension, a width and a wall thickness wherein the ratio of said longitudinal dimension to said width is at least 1; and wherein the ratio of said longitudinal dimension to said wall thickness is at least 10.

2. A static mixer in accordance with claim 1 wherein at least one of said installation bodies has a longitudinal axis aligned in the direction of said longitudinal axis of said housing and said one installation body spans said housing to define a mixing space having a cross-sectional flow area in a plane normal to said longitudinal axis of said one installation body, said one installation body having at least one wall element for the division and/or deflection of the fluid flow into a direction deviating from the longitudinal direction;
and wherein a cross-sectional area formed by an intersection of said wall element with said plane amounts to a maximum of ⅕ of the cross-sectional flow area of said mixing space.

3. A static mixer in accordance with claim 2 wherein said wall element divides said mixing space into two part regions.

4. A static mixer in accordance with claim 2 wherein said installation body has a plurality of said wall elements wherein three wall elements of said plurality of wall elements are angularly disposed relative to said axis of said installation body and two wall elements of said plurality of wall elements are parallel to said axis of said installation body.

5. A static mixer in accordance with claim 2 wherein said wall element is spiral shaped and wherein said cross-sectional area formed by an intersection of said wall element with said plane is rotated relative to an opposite end of said wall element.

6. A static mixer in accordance with claim 2 wherein said wall element has a first broad side forming a flow-dividing edge and an oppositely disposed second broad side and wherein said one installation body further includes a deflection element integral with said second broad side of said wall element for the deflection of a flow from a first part region of said mixing space into a second part region of said mixing space.

7. A static mixer in accordance with claim 6 wherein a surface of said wall element bounded by said first and second broad sides and by longitudinal sides of said wall element is aligned substantially in the direction of said longitudinal axis of said one installation body.

8. A static mixer in accordance with claim 7 wherein said surface of said wall element is disposed in a transverse plane aligned at an angle to said longitudinal axis of said one installation body of from 45° to 90°.

9. A static mixer in accordance with claim 7 wherein said surface of said wall element is disposed in a transverse plane aligned at an angle to said longitudinal axis of said one installation body of from 60° to 90°.

10. A static mixer in accordance with claim 7 wherein said surface of said wall element is disposed in a transverse plane aligned at an angle to said longitudinal axis of said one installation body of from 75° to 90°.

11. A static mixer in accordance with claim 1 further comprising a plurality of connection elements extending longitudinally of said housing and connecting said at least two installation bodies together.

\* \* \* \* \*

UNITED STATES PATENT AND TRADEMARK OFFICE
CERTIFICATE OF CORRECTION

PATENT NO. : 8,753,006 B2
APPLICATION NO. : 12/589009
DATED : June 17, 2014
INVENTOR(S) : Habibi-Naimi Page 1 of 1

It is certified that error appears in the above-identified patent and that said Letters Patent is hereby corrected as shown below:

In the Claim

Claim 1, Column 12, line 28, cancel "disposed in said"

Signed and Sealed this
Twenty-third Day of September, 2014

Michelle K. Lee
*Deputy Director of the United States Patent and Trademark Office*